United States Patent [19]

Boegli

[11] Patent Number: 4,777,601
[45] Date of Patent: Oct. 11, 1988

[54] METHOD AND APPARATUS FOR A PASSIVE TRACK SYSTEM FOR GUIDING AND CONTROLLING ROBOTIC TRANSPORT AND ASSEMBLY OR INSTALLATION DEVICES

[75] Inventor: Peter Boegli, Studen, Switzerland

[73] Assignee: JD-Technologie AG, Zug, Switzerland

[21] Appl. No.: 835,248

[22] Filed: Mar. 3, 1986

[30] Foreign Application Priority Data

Mar. 15, 1985 [CH] Switzerland ............... 01173/85

[51] Int. Cl.$^4$ .................. B62D 1/00; G06F 15/50
[52] U.S. Cl. ................ 364/424.02; 180/169; 180/168
[58] Field of Search .............. 364/424, 443, 436; 318/587; 180/167, 168, 169; 250/202

[56] References Cited

U.S. PATENT DOCUMENTS

| | | | |
|---|---|---|---|
| 3,738,443 | 6/1973 | Kabo ................... | 180/168 |
| 3,935,922 | 2/1976 | Cooper et al. ........ | 180/168 |
| 4,003,445 | 1/1977 | De Bruine ............ | 180/168 |
| 4,020,918 | 5/1977 | Houskamp et al. .... | 180/168 |
| 4,139,862 | 2/1979 | Haskell et al. ....... | 358/81 |
| 4,278,142 | 7/1981 | Kono ................... | 180/168 |
| 4,345,662 | 8/1982 | Deplante ............. | 180/168 |
| 4,530,057 | 7/1985 | Ahlbom ............... | 364/424 |
| 4,541,049 | 9/1985 | Ahlbom ............... | 364/424 |
| 4,566,032 | 1/1986 | Hirooka et al. ...... | 364/424 |
| 4,593,239 | 6/1986 | Yamamoto ........... | 318/587 |

FOREIGN PATENT DOCUMENTS 0012554 6/1980 European Pat. Off. .

OTHER PUBLICATIONS

Proceedings of the Fourth International Symposium on Industrial Robots, pp. 385 to 393, "Unattended Traveling Vehicle Guided by Optical Means" by Ando et al., published Nov. 19, 1974, by Japan Industrial Robot Association, Tokyo, especially p. 389, lines 1 through 14 and Figure 4.

Primary Examiner—Parshotam S. Lall
Assistant Examiner—Thomas G. Black
Attorney, Agent, or Firm—Werner W. Kleeman

[57] ABSTRACT

The passive track system comprises a passive track formed as a highly reflective strip adhered to the floor and containing a bar code, vehicle-supported passive track reading devices for forward and reverse travel as well as a bar code reading device. The passive track system can be operated as a passive track guidance system or as a passive track control system or both. The vehicle follows the passive track or guide path by continuously monitoring the travel lane on both sides of the central longitudinal axis of the vehicle using track sensors located in reading heads. In the method, sets of actual values thus measured are cross-correlated with a set of reference values corresponding to the track positions and stored in an electronic evaluation device. The appropriate cross-correlation function is calculated for each "observation" using a special track guidance algorithm and then a track position of the vehicle as well as a quality or system condition factor for the passive track system are derived. Control is also effected by the passive track. The vehicle decodes the bar code using code sensors and processes it as a control signal. The passive track is useful both as a control line for track guidance and as a signal source for functional control. Since the passive track is easily and quickly applicable to and removable from the floor, it renders possible a freely chosen layout of the travel network and thus an optimal utilization of the flexibility of trackless vehicles.

26 Claims, 5 Drawing Sheets

| Travel Zone No. | System Condition Factors Measured by Vehicles | | | | |
|---|---|---|---|---|---|
| | No. 1 | No. 2 | No. 3 | No. 4 | No. 5 |
| 1 | 155 | 120 | 193 | 45 | 107 |
| 2 | 55 | 67 | 83 | 33 | 71 |
| 3 | 125 | 102 | 160 | 54 | 95 |
| 4 | 187 | 151 | 210 | 63 | 120 |
| 5 | 201 | 168 | 224 | 82 | 131 |
| 6 | 190 | 152 | 211 | 74 | 125 |
| 7 | 161 | 129 | 199 | 41 | 115 |
| 8 | 134 | 110 | 161 | 59 | 99 |

METHOD AND APPARATUS FOR A PASSIVE TRACK SYSTEM FOR GUIDING AND CONTROLLING ROBOTIC TRANSPORT AND ASSEMBLY OR INSTALLATION DEVICES

BACKGROUND OF THE INVENTION

The present invention broadly relates to vehicle guidance systems and, more specifically, pertains to a new and improved passive track system for robotic transport and assembly devices.

Generally speaking, the present invention relates to a passive track system for guiding and controlling robotic or driverless transport and assembly devices, especially floor-level industrial trucks or conveyances, comprising a passive track serving as a control line or guide marker applied to the floor and having at least one characteristic differentiating it from the remaining travel lane, as well as a vehicle-supported sensing or scanning device for following the passive track.

In other words, the passive track guidance and control system of the present invention is for use on a traffic surface for robotic vehicles and comprises a passive track applied to the traffic surface as a guide marker for guiding the robotic vehicles. The traffic surface has at least one identifying characteristic and the passive track has a centerline and exhibits at least one identifying characteristic optically distinguishable from the at least one identifying characteristic of the traffic surface. An optical sensing device is mounted on each vehicle of the robotic vehicles for optically tracking the passive track.

The method of the present invention is for operating a passive track guidance and control system on a traffic surface for robotic vehicles and comprises the steps of employing an optical sensing device mounted on at least one vehicle of the robotic vehicles and comprising a plurality of track sensors to monitor a passive track applied to the traffic surface during travel of the at least one vehicle on the traffic surface and directionally guiding the vehicle in relation to information gained by the optical sensing device when monitoring the passive track.

Such passive track systems are generally employed for guiding conveyance devices or objects along a control line or guide marker and to optimally exploit the flexibility of trackless conveyance equipment, as for example in the construction and operation of flexible production or manufacturing systems.

The present state of the art for the guidance of robotic transport devices is characterized by the widespread usage of electrically insulated inductive loops laid into the floor or traffic surface through which a low frequency alternating current is conducted. The laying of such inductive loops in the floor is expensive and time-consuming and the flexibility inherent in trackless vehicles is thereby under-utilized, since this type of guidance line built into the floor cannot readily have its path altered, nor can it be changed without interrupting traffic or disturbing the environment. Guidance systems have therefore become known which use passive control lines or guide markers, i.e. control or guide marker lines through which no electrical current flows. Such passive control or guide marker lines are applied directly to the floor or traffic surface without requiring electrical insulation so that they also can be easily and quickly removed at any time.

The present invention concerns a vehicle guidance system with a passive control line or guide marker, such as that described in the German Patent Publication No. 2,959,204. This known passive track guidance system functions according to the principle of brightness equilibrium and uses as a control line or guide marker a light-colored band or stripe which is bordered on both sides by two contrast-enhancing dark-colored bands or stripes. Light emitted from the vehicle is reflected from the three bands or stripes and received by two vehicle-supported light sensors, each of which generates a signal which is proportional to the average brightness within an associated window of equally large sensing or detection windows. If the first light sensor delivers a greater signal through its associated sensing window than the second light sensor through its associated sensing window, then the lateral track position of the vehicle is corrected in reference to the one light-colored and the two dark-colored bands or stripes such that both sensing windows receive the same average brightness and such that brightness equilibrium is reestablished.

As simple as this track guidance system is, it is encumbered with a number of disadvantages: For one thing, the sensitivity of the system is a function of contrast and in general is proportional to $(R1-R2)/(R2+R2)$ with $R1$ and $R2$ equal to the respective coefficients of reflection of the light-colored and dark-colored bands or stripes. For this reason as high and especially as constant a contrast as possible must be guaranteed at the track edges in order to avoid stability problems in the steering-regulation circuit. It is therefore not possible to dispense with the two dark-colored lateral bands or stripes provided on both sides of the light-colored band or stripe. This increases the expense of a thus-designed passive track and complicates its implementation in a travel network.

Further disadvantages ensue from the fact that this track guidance system reacts exceptionally sensitively to contamination, on the one hand due to the attendant reduction in contrast and on the other hand due to the integral detection of an average brightness value as opposed to edge-tracking. In particular, the asymmetrical contamination values which must generally be expected lead directly to an indeterminate offset. It is also a disadvantage that the track guidance system according to the aforesaid German Patent Publication responds stably only as long as both detection windows have their outer edges within the dark-colored bands or stripes and their inner edges within the light-colored band or stripe. Outside this detection range an undifferentiated or passive behavior or even an inversely coupled behavior can be observed. A reduced recovery or correction zone of track guidance ensues which can have a detrimental effect upon reliability of guidance.

SUMMARY OF THE INVENTION

Therefore, with the foregoing in mind, it is a primary object of the present invention to provide a new and improved construction of a passive track system which does not exhibit the aforementioned drawbacks and shortcomings of the prior art constructions.

Another and more specific object of the present invention aims at providing a new and improved construction of a passive track system for guiding and controlling robotic transport and assembly or installation vehicles or devices, which system has increased flexibility and which is particularly simple in design and operation.

It is a further object of the invention to provide a control line or guide marker which is designed such that it is easily and quickly applicable to the floor and also can be removed later.

Yet a further object is to provide a control line or guide marker which serves both to guide the vehicles as well as to functionally control the vehicles.

Additionally, it is an object of the present invention to provide a new and improved passive track system which is exceptionally tolerant of contamination of the control line or guide marker and travel lane as well as having a greater reliability against interference and functional reliability.

Yet another significant object of the present invention aims at providing a new and improved construction of a passive track system of the character described which is relatively simple in design, extremely economical to manufacture, highly reliable in operation, not readily subject to breakdown or malfunction and requires a minimum of maintenance and servicing.

Now in order to implement these and still further objects of the invention, which will become more readily apparent as the description proceeds, the passive track system of the present invention is manifested by the features that in order to provide continuous track guidance of the vehicles, a set of actual values ($f_1, f_2, \ldots f_n$) measured by n track sensors arranged transversely on the underside of the vehicle and symmetrical to the central longitudinal axis of the vehicle in a uniform mutual spacing d and a set of reference values ($s_1, s_2, \ldots s_{2n}$) having the same uniform mutual spacing d as the track sensors and arranged transversely and symmetrically relative to the passive track centerline and assigned to 2n track locations or track stripes ($SL_1, SL_2, \ldots SL_{2n}$), both characterizing the passive track and the regions of the floor or traffic surface adjacent both sides thereof relative to the characteristic M, are statistically combined or correlated in a vehicle-supported or on-board control processor. A system quality factor or optical condition coefficient for the passive track system is then derived therefrom. The passive track comprises a bar code formed by spacings or gaps in the passive track. The bar code serves both as information for vehicle control and as a control line or guide marker for vehicle guidance.

In other words, the passive track guidance and control system of the present invention is manifested by the features that each vehicle has an underside and a central longitudinal axis. The optical sensing device comprises a plurality of track sensors transversely arrayed in a uniform mutual spacing on the underside of each vehicle in symmetrical relation to the central longitudinal axis. The passive track comprises a number of track stripes twice as great as the plurality of track sensors arrayed in the same uniform mutual spacing on the track surface in symmetrical relation to the centerline. A control processor is mounted in each vehicle for performing statistical correlation of a set of actual values detected by the plurality of track sensors in relation to the number of track stripes and characterizing the passive track and regions of the traffic surface adjacent to the passive track relative to the identifying characteristic with a set of reference values associated with the track stripes and also characterizing the passive track and said regions relative to the identifying characteristic and for deriving from the statistical correlation an optical condition coefficient of the passive track. The passive track comprises discrete track marks defining track spaces therebetween. The discrete track marks and the track spaces conjointly define a bar code. The bar code contains control information for controlling vehicles.

The method of the present invention is manifested by the features that it comprises the steps of employing a control processor mounted on the at least one vehicle to perform statistical correlation of the information gained by the optical sensing device withe reference data relative to the passive track, deriving from the statistical correlation an optical condition coefficient of the passive track, employing the control processor to decode control information incorporated into the passive track in the form of a bar code and controlling operational functions of the vehicle in relation to th control information.

Advantages ensue from the inventive utilization of an optical system whose commercially available sensors have a higher resolution in relation to the provided minimal spacing or pitch than other sensors, for example inductive sensors. This permits the vehicle to determine very precisely its instantaneous position relative to the travel lane and thus to follow the passive track with a high degree of accuracy. The higher resolution of the reading device permits a greater density of information in the bar code without a reduction in readability. This obviously allows a greater number of generally position-related control functions to be stored along a short distance section or travel zone of the passive track, which significantly facilitates the accommodation of functions to be performed by the vehicle at crossings and transfer locations.

Furthermore, it has proven advantageous that the inventive passive track system is capable of self-monitoring and that, based upon a system quality or optical condition factor or coefficient which is continuously calculated, preventive maintenance is possible. In such a manner it is possible to nevertheless operate in the open air or under generally difficult conditions a track guidance system which is sensitive sui generis to contamination. Possible disruptions or breakdowns of the travel lane or of the sensing or scanning device are timely indicated by the system quality or optical condition factor or coefficient so that they may be eliminated or corrected before a break or interruption in operation occurs.

Significant advantages also result from the fact that the system components for track guidance and functional control are both opto-electronic in nature and are thus based upon a uniform or common technology. Thus it is possible to combine the reading heads for the passive track and bar code in an integrated optics block. Furthermore, various elements such as electronic printed circuit boards, housings, connecting cables et cetera can be utilized for both distinct functions, namely for track guidance as well as for code reading. This facilitates assembly, installation and adjustment or calibration of the passive track system and simplifies its maintenance including stockage of spare parts which generally leads to a solution involving lower costs.

Furthermore, the innovative passive track system is fully compatible with conventional inductive track guidance systems. The reading device of the previously mentioned passive track system, comprising a reading head and an electronic evaluation circuit or device, substantially corresponds both functionally and in the interface to vehicle control circuits with known ferrite antennae with subsequent signal separation using inductive loops. The previously mentioned passive track system is therefore especially well-suited for modifying and retrofitting existing inductive track guidance systems. Since, moreover, the significant characteristics of the passive track system, namely the design of the passive track, the special optical reading device as well as the novel evaluation of received signals, are based on the formation of statistical averages for the operation of trackless vehicles, the system's employment, especially in flexible production or manufacturing systems, is economical and efficient.

BRIEF DESCRIPTION OF THE DRAWINGS

The invention will be better understood and objects other than those set forth above will become apparent when consideration is given to the following detailed description thereof. Such description makes reference to the annexed drawings wherein throughout the various figures of the drawings there have been generally used the same reference characters to denote the same or analogous components and wherein:

FIG. 2b shows a preferred embodiment of a reading head for following the passive track according to FIG. 2a;

FIG. 3a is a graphical illustration of the cross-correlation functions with centered and eccentric or offset track positions of the vehicles according to Figure 2a;

DETAILED DESCRIPTION OF THE PREFERRED EMBODIMENTS

Figures 1, 4:
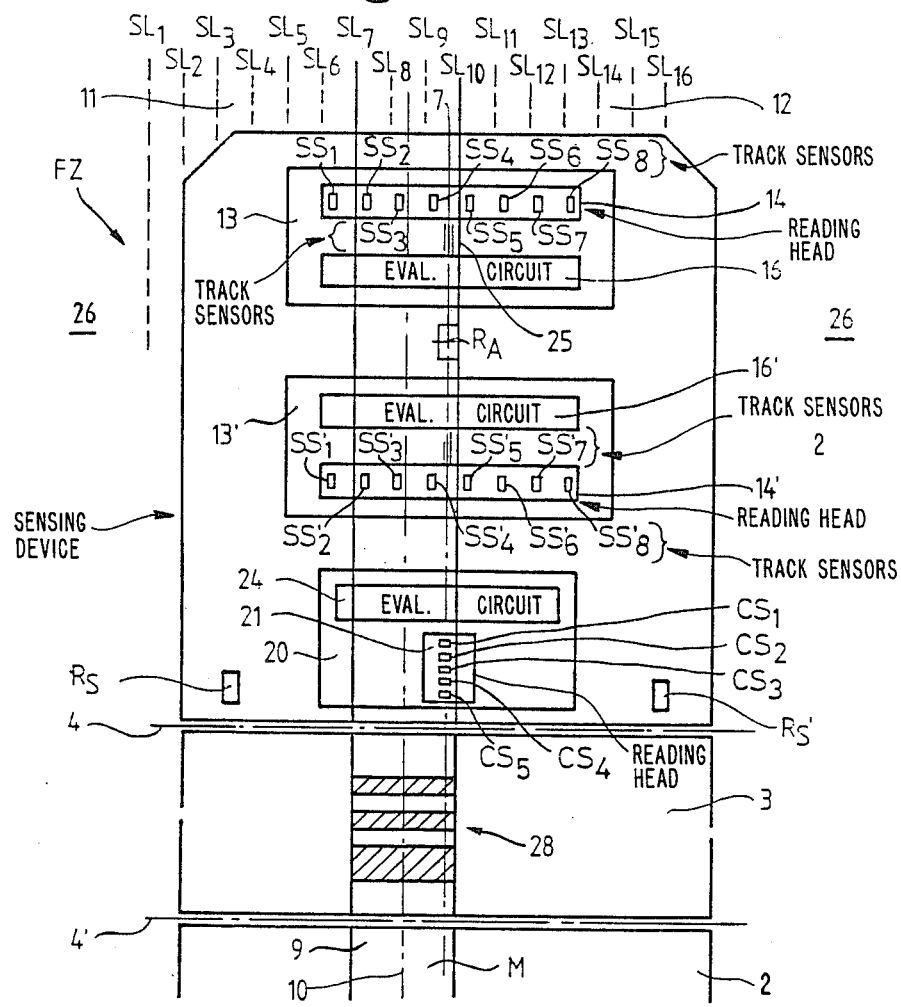
FIG. 1 is a schematic plan view of an arrangement of the passive track system with the apparatus components for guiding and controlling a vehicle.
FIG. 4 is a tabulation listing and evaluating measured system quality or optical condition factors.

Describing now the drawings, it is to be understood that to simplify the showing thereof only enough of the structure of the passive track system has been illustrated therein as is needed to enable one skilled in the art to readily understand the underlying principle and concepts of the present invention. Turning now specifically to FIG. 1 of the drawings, the arrangement illustrated therein by way of example and not limitation, will be seen to comprise an exemplary embodiment of the passive track system for guiding and controlling a vehicle FZ.

The vehicle FZ comprises two separate drive modules or cells 2 which are connected in a mirror-image relationship to a load-carrying connection member or support body 3 by respective links or joints 4 and 4'. The two separate drive modules 2 are substantially identically constructed. Only one drive module or cell 2 thereof is fully illustrated in FIG. 1. Each drive module or cell 2 substantially comprises a not particularly shown steerable drive wheel $R_A$ with a driving and steering servo-drive unit, two caster support wheels $R_S$ and $R_S'$ as well as the requisite reading devices 13 and 20 for sensing or scanning a passive track 9 or a bar code 28 or both.

The exemplary embodiment of the vehicle FZ is completely symmetrical with respect to forward and reverse drive. The passive track 9, which can be permanently applied to the floor by a simple process or method such as by painting, spraying or gluing and can also easily be removed for repairs or alterations, will normally comprise a highly reflecting strip or band of plastic or synthetic material adhered or glued to the floor or traffic surface. The plastic or synthetic material selected has sufficiently high contrast with respect to numerous types of floor materials of different qualities, has high resistance to wear and is resistant to chemicals and other substances customarily used in industry. The passive track 9 of the exemplary embodiment can also be cleaned with a conventional cleaning machine.

The passive track guidance system comprises the passive track 9, which is affixed to the floor, as well as vehicle-supported passive track reading devices 13 and 13' for forward and reverse drive, respectively, which contain respective reading heads 14 and 14' and electronic evaluation circuits or devices 16 and 16'. Each of the reading heads 14 and 14' contain eight track sensors $SS_1$, $SS_2$ ... $SS_8$ and $SS_1'$, $SS_{22}'$ ... $SS_8'$, respectively, as active optical elements mounted or attached to the underside of the vehicle FZ. Sixteen track positions or location are designated with $SL_1$, $SL_2$ ... $SL_{16}$, each comprising a specific brightness value for their regions of the travel lane which depends upon whether the associated brightness measuring window lies totally in the passive track 9 ($SL_8$ and $SL_9$), totally in the floor regions 11 and 12 ($SL_1$ to $SL_6$ and $SL_{11}$ to $SL_{16}$) adjoining both sides or each half in the passive track 9 and half in either of the adjacent floor regions 11 and 12 ($SL_7$ and $SL_{10}$). These brightness values represent a transversely-oriented discrete brightness profile of the travel lane which serves as a "model" or "pattern". Any possible deviation from the track is determined or sensed by the vehicle by comparing its instantaneous or immediate track position, which is defined by the light values measured by the respective track sensors $SS_1$, $SS_2$ ... $SS_8$ and $SS_1'$, $SS_2'$ ... $SS_8/$, with the "model" or "pattern".

The passive track control system additionally comprises a bar code 28 forming part of the passive track 9 as well as a vehicle-supported bar code reading device 20 containing a reading head 21 with code sensors $CS_1$, $CS_2$ ... $CS_5$ and an electronic evaluation circuit or device 24.

Figure 2A:
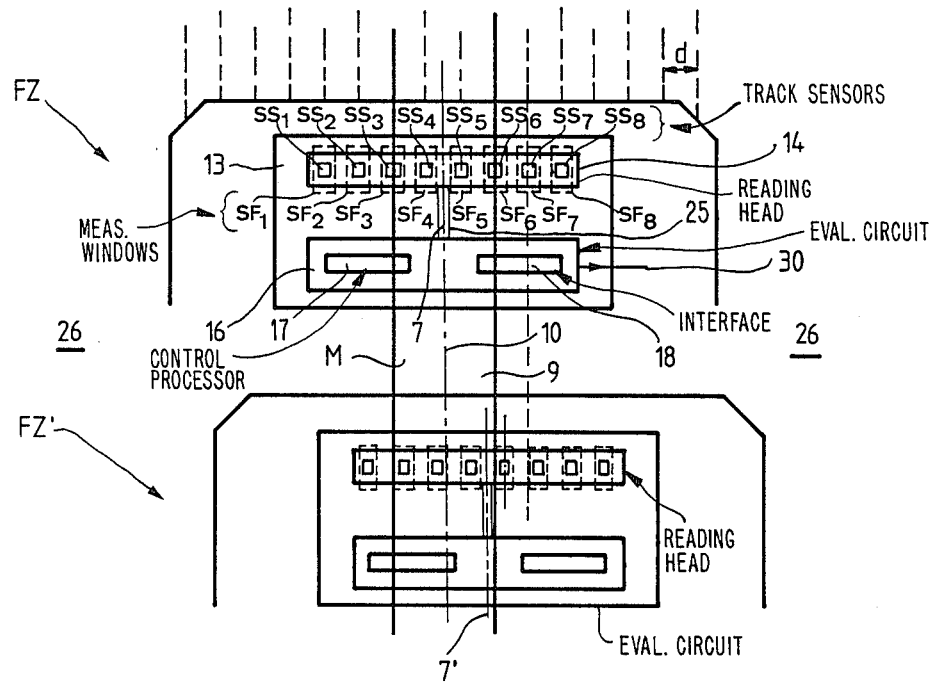
FIG. 2a schematically illustrates a basic embodiment of the invention as a passive track guidance system with vehicles in a centered position and in an eccentric or offset position in relation to the passive track.

In FIG. 2a the passive track guidance system is illustrated with two vehicles FZ and FZ' which are respectively centered on the passive track 9 or laterally displaced by 1.25 track positions to the right on the travel lane. To simplify the illustration only the guidance system for the forward driving direction is shown. The passive track reading device 13, comprising the reading head 14 and the electronic evaluation circuit or device 16, largely corresponds both functionally and in the interface to vehicle control circuits to known ferrite antennae for inductive loops with subsequent signal processing, so that the option thus exists of using either the one or the other track guidance system. To ensure compatibility, the position information supplied to an on-board computer or control processor 17 for vehicle control via the parallel output 30 takes, for both systems, the form of digital or binary values in the decimal range from −127 to +128. The reading device 13 is largely insensitive to extraneous or external light such as work area illumination from light bulbs or gas discharge lamps, sunlight as well as infrared irradiation by various optical detectors, i.e. optical emitter and detector system et cetera. This is achieved primarily by a certain screening or shielding effect of the body of the vehicle FZ or FZ' in a vertical direction.

In consideration of calculation speed, resolution and space requirements, the number of track sensors $SS_1$–$SS_8$ was set at n =8. In order to ensure an adequate recovery or correction zone, the individual track sensors $SS_1$–$SS_8$ are linearly mounted at intervals of 12.5 mm transverse to the direction of travel. The active surface area of each track sensor $SS_1$–$SS_8$ is 3.2 mm×1.55 mm. Up to two reading heads can be connected through a cable 25 to the electronic evaluation circuit or device 16. The electronic evaluation circuit or device 16 comprises a control processor 17 and an interface or circuit 18 on a circuit board and is equipped for performing all requisite functions. The software of the control processor 17 contains all the necessary programs for calculation of track deviation parameters by using a procedure explained in more detail hereinbelow for controlling and monitoring tests such as, e.g., track being and track end as well as for data transmission to the on-board vehicle computer or control processor 17.

Figure 2B:
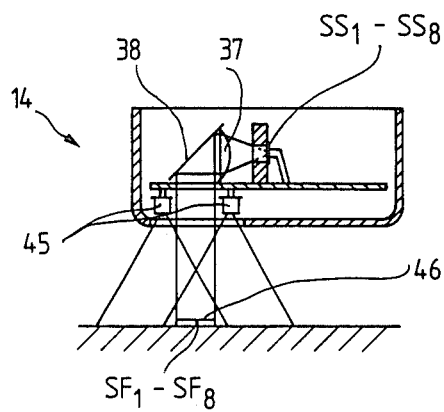

According to FIG. 2b the reading head 14 can be furnished with a 90 beam deflector. LEDs or infrared emitters 45 irradiate or illuminate the region of the travel lane in the vicinity of the reading head 14. The light reflected within the track brightness measuring or detection windows $SF_1$, $SF_2$ ... $SF_8$ is, after deflection by an integrated prism 38 with an eight-fold convergent or focusing lens 37, directed or transmitted onto the active surfaces of the track sensors $SS_1$, $SS_2$ ... $SS_8$. In order to maximize the light output or efficiency, a simple optical system is built in with an image magnification of 4:1. An active track brightness measuring or detection window $SF_1$, $SF_2$ ... $SF_8$ of 12.8×6.2 mm is thereby achieved for each track sensor.

Figure 3A:
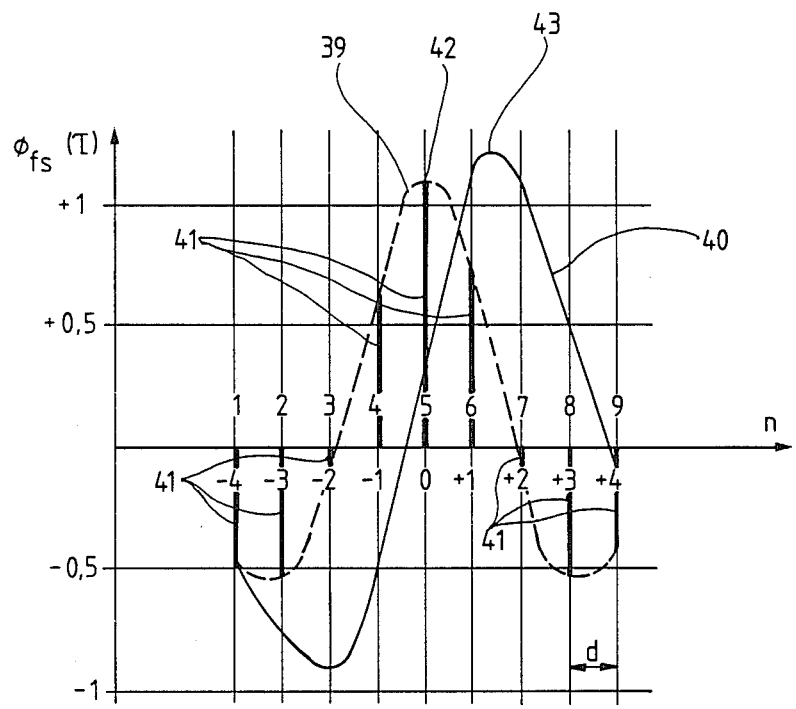

FIG. 3a illustrates the cross-correlation function curves 39 and 40 corresponding to the respective centered and eccentric or offset track positions of both vehicles FZ and FZ' in FIG. 2a. According to the uniform mutual track spacing d used, discrete functions consisting of given or ordinate values 41 are assigned to the reference coordinates 1 to 9 along the abscissa. The maxima 42 and 43 are of importance because their associated reference coordinates along the abscissa coincide with the track positions of the respective vehicles FZ and FZ', independent of the brightness of the passive track 9 or of the background finish, thus indicating their actual position relative to the passive track.

Figure 3B:
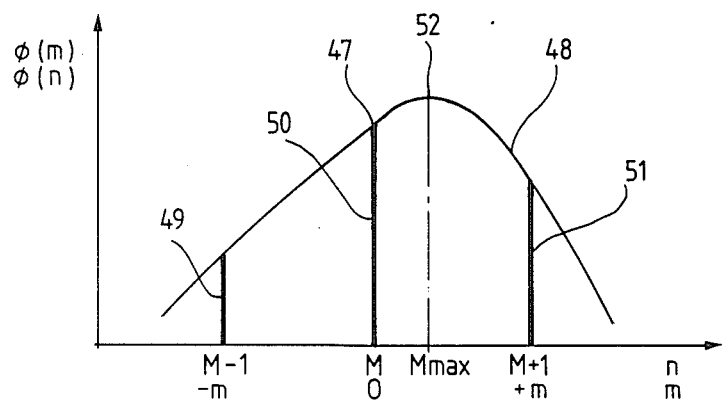
FIG. 3b is a graphical illustration for interpolation of the cross-correlation function in the region of its maximum.

The maxima 42 and 43 can coincide with one given or ordinate value or, as will much more often be the case, can assume a position intermediate two given or ordinate values. In this latter case, the procedure illustrated in FIG. 3b is applicable. In the region of a maximum value 47 of the nine given or ordinate values, the discrete cross-correlation function is replaced by a continuous curve 48 which results from the quadratic interpolation of the given or ordinate values 49, 50 and 51 at the reference coordinates M-1, M and M+1 along the abscissa. The absolute maximum value is indicated by 52 and assumes the position $M_{max}$.

FIG. 4 shows a table relating to the system quality or optical condition factor or coefficient. This table shows for each possible assignment between eight travel zones or sections and, for instance, five vehicles a corresponding system quality or optical condition factor or coefficient of the passive track system, "1"indicating unusable and "255" representing the ideal condition. These system quality or optical condition signals or factors or coefficients are calculated by the vehicles but always reflect the entire system quality or optical condition of the portion of the passive track system supporting one vehicle FZ and the corresponding passive track 9 of the associated travel zone or section distance.

When several vehicles are being used in the same layout, the system quality or optical condition factors or coefficients of the travel zones are transmitted by conventional and therefore not particularly shown means for each individual vehicles to a conventional and therefore not particularly shown supervisory stationary control processor or computer.

The stationary control processor or computer, which is necessary anyway for dispatching purposes even when employing processor-controlled vehicles FZ, maintains the table shown in FIG. 4. It is apparent that the table of FIG. 4 illustrates a system condition or state in which no total defect exists. On the other hand, it is apparent from a comparison of all of the values (vehicles and travel zones) that the passive track 9 in the travel zone No. 2 is contaminated or worn at one or more locations and that vehicle No. 4 and possibly vehicle No. 5 should be checked. The stationary control processor or, alternatively, the on-board control processors 17 of each vehicles FZ in the passive track system assign by majority decision a calculated optical condition factor to each vehicle FZ and each travel zone of the passive track system.

Figure 5:
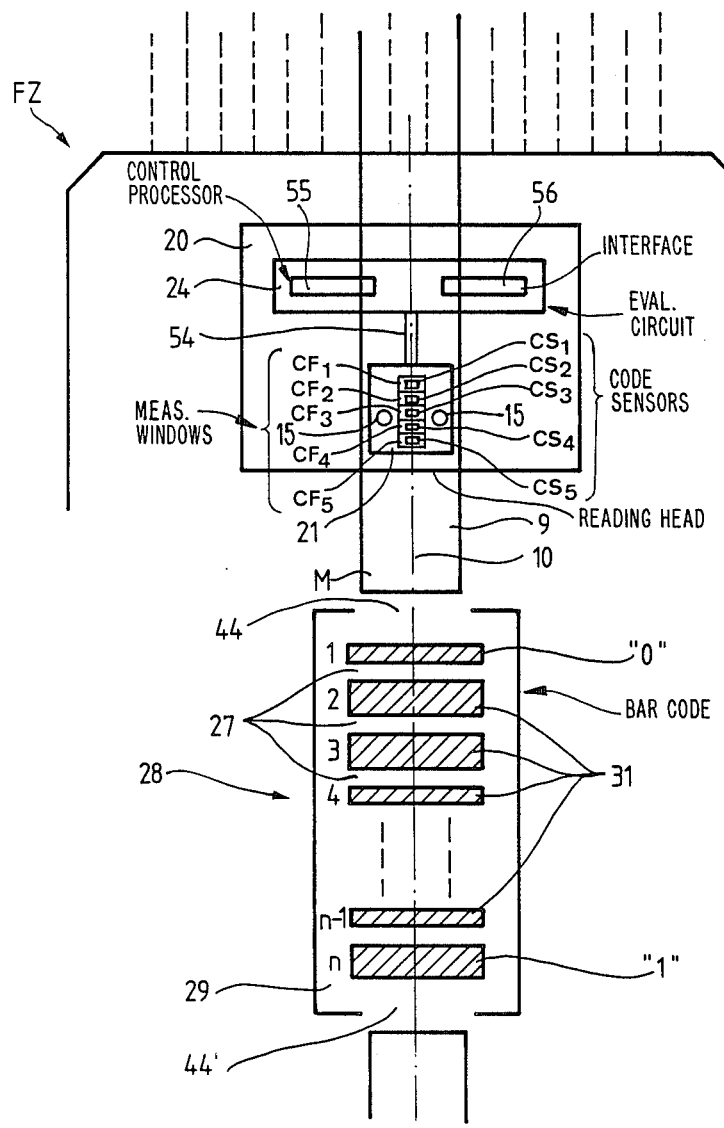
FIG. 5 is a schematic illustration of the invention as a passive track control system with a preferred embodiment of the bar code as a portion of the passive track.

FIG. 5 illustrates an embodiment of the passive track system serving as a passive track control system comprising the bar code 28 applied to the floor and a bar code reading device 20 installed or mounted in the vehicle FZ. The bar code 28 basically comprises transversely-oriented spacings or gaps 27 formed in the control line or guide marker M and therefore is an integral portion of the passive track 9. Like the passive track 9, the bar code 28 can also be permanently applied to the floor by processes such as painting, spraying or gluing and can also be removed again for effecting repairs or alterations.

The bar code 28 illustrated in the preferred embodiment of the invention shown in FIG. 5 comprises a low reflecting adhesive strip or tape 29 of a plastic or a synthetic material which serves as a contrast-enhancing background finish and upon which highly reflective code strips 31 are affixed. These code strips 31 are made of the same material as the passive track 9, but exceed the width of the passive track 9 in order to allow for a reliable reading of the bar code 28 even in the presence of large track deviations.

Furthermore, the code strips 31 are differentiated by two different sizes in the longitudinal direction of the passive track 9 referred to as logical "0" and logical "1" such that in the previously mentioned preferred embodiment these code strips 31 exhibit the following exemplary dimensions: logical "0"=53×5 mm and logical "1 "=53×11.5 mm. The spacing or gap 27 between the individual code strips 31 is a uniform 8 mm. To initiate or terminate reading the code, more pronounced spacings or gaps 44 and 44', both ≧43.5 mm, are provided at the beginning and end of the code sequence. A further preferred embodiment of the bar code 28 comprises a piece of aluminum foil or thin sheet metal affixed to the floor or traffic surface in which the pattern of the code is anodized in black and white.

The bar code reading device 20 installed in the vehicle FZ for reading the bar code 28 comprises the reading head 21 and the electronic evaluation circuit or device 24 and is integrated into the passive track reading devices 13 and 13' or, alternatively, constructed separately if the passive track control system is used separately from the passive track guidance system. The code sensors $CS_1$, $CS_2$ ... $CS_5$ have an active sensor area of $1 \times 1$ mm and are arranged consecutively in the direction of travel and separated by a distance of 1.5 mm. By utilizing an optical system with a magnification of 2:1, an active code surface area of $2 \times 2$ mm is achieved. Solid state or semiconductor light sources, such as illuminating or light-emitting diodes 15 and 15', are installed on both sides of the code sensors $CS_1$, $CS_2$ ... $CS_5$ for illuminating the bar code 28.

A maximum of two reading heads 21 can be attached to the electronic evaluation circuit or device 24 by means of a connecting cable 54. An on-board or mobile control processor or circuit board 55 and an interface circuit 56 are contained within the electronic evaluation circuit or device 24 which is equipped to perform all functions relating to normal operation.

Figure 6A:
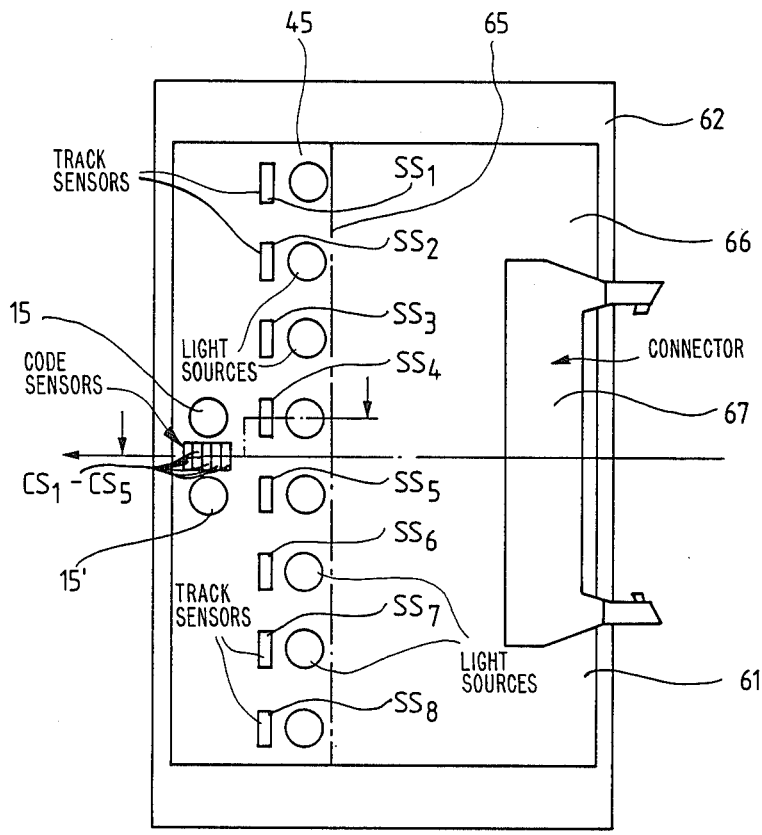
FIG. 6a shows a plan view of the integrated reading head for following the passive track as well as for reading the bar code.
Figure 6B:
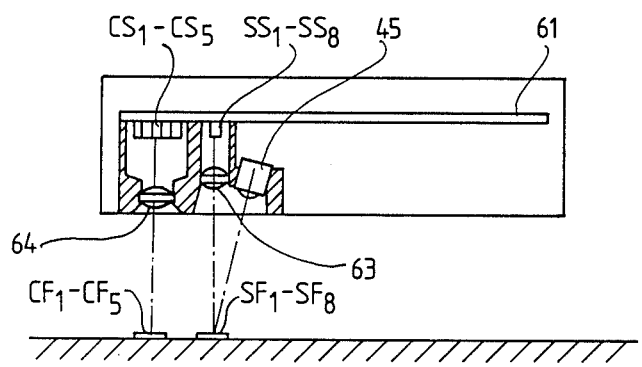
FIG. 6b shows a cross-section of the integrated reading head of FIG. 6a for following the passive track as well as for reading the bar code.

The integration of the respective reading heads 14 and 21 for the passive track 9 and the bar code 28, which is achieved by utilizing a common technology, is illustrated as a preferred embodiment in FIG. 6. The track sensors $SS_1$ ... $SS_8$ as well as the code sensors $CS_1$ ... $CS_5$, including their respective optical magnifying systems 63 and 64 and respective illuminating or light-emitting diodes 45 and 15, are combined into an optical block 65 on a circuit board 61 in a housing 62 which is connected to the control processor 17 of the vehicle FZ through an electronic system 66 and a plug or connector 67. This preferred embodiment of the invention contemplates an elimination of the right-angled deflection of the light or radiation beam for the track sensors $SS_1$ ... $SS_8$ uses only one light or radiation source for illuminating the respective track brightness measuring windows $SF_1$ ... $SF_8$.

The functional operation of the inventive passive track system is explained hereinbelow in relation to its two main functions, namely track guidance and functional control.

The eight track sensors $SS_1$, $SS_2$ ... $SS_8$ have a basic or fundamental importance for the operation of the passive track guidance system as illustrated in FIGS. 2a and 2b. They monitor or sense the travel lane and inform the vehicle FZ of the region of the travel lane over which the vehicle FZ is presently situated by delivering electrical signals $f_1$, $f_2$ ... $f_8$ which are proportional to the average brightness within the track brightness measuring windows $SF_1$ ... $SF_8$ for the respective region of the travel lane and which are designated or denoted as actual values or actual value signals. Since the track positions $SL_1$, $SL_2$ ... $SL_{16}$ on the travel lane 26 as well as the track sensors $SS_1$, $SS_2$ ... $SS_8$ on the underside of the vehicle FZ have the same arrangement or layout and the same uniform mutual spacing or separation d and, furthermore, since the width of the passive track 9 in the aforesaid preferred embodiment of the invention corresponds to three times the uniform mutual track position spacing or separation d, then the following actual values result for the positions of both vehicles FZ and FZ' illustrated in FIG. 2 after signal processing:

For the track-centered position of the vehicle FZ:

| n = | 1 | 2 | 3 | 4 | 5 | 6 | 7 | 8 |
|---|---|---|---|---|---|---|---|---|
| f(n) = | 0.1 | 0.1 | 0.5 | 0.9 | 0.9 | 0.5 | 0.1 | 0.1 |

For the displaced or eccentric track position of the vehicle FZ':

| n = | 1 | 2 | 3 | 4 | 5 | 6 | 7 | 8 |
|---|---|---|---|---|---|---|---|---|
| f(n) = | 0.1 | 0.9 | 0.9 | 0.9 | 0.1 | 0.1 | 0.1 | 0.1 |

Both of these sets of actual values represent two brightness profiles of the travel zone along both sides of the central longitudinal axis 7 of each vehicle FZ which the vehicles FZ and FZ' are presently situated over, each extending over four track position spacings or separations.

On the other hand, the brightness values corresponding to the sixteen track positions $SL_1$ ... $SL_{16}$ become—after suitable transformation and normalization according to equation (3) given below—the following set of nominal or reference values:

| n = | 1 | 2 | 3 | 4 | 5 | 6 | 7 | 8 |
|---|---|---|---|---|---|---|---|---|
| s(n) = | −3/16 | −3/16 | −3/16 | −3/16 | −3/16 | −3/16 | +5/16 | +13/16 |
| n = | 9 | 10 | 11 | 12 | 13 | 14 | 15 | 16 |
| s(n) = | +13/16 | +5/16 | −3/16 | −3/16 | −3/16 | −3/16 | −3/16 | −3/16 |

This set of nominal or reference values is stored in the control processor or circuit 17 and represents a normalized brightness profile of the travel lane which extends transversely on both sides of a passive track centerline 10 over each of the eight sensed track position spacings or separations d.

In order to determine the track position, the vehicle FZ establishes which region of the nominal or reference brightness profiles conforms best to the measured actual brightness profiles. The means position of this region then corresponds to the track position of the vehicle FZ.

The best agreement or correlation of both of the brightness profiles is determined analytically by cross-correlation of the set of actual values with the set of nominal or reference values. In the present instance, it will be assumed that the cross-correlation is define as:

$$\phi_{fs}(\tau) = \sum_{i=1}^{n} (f_i - \bar{f}) \cdot s_{i+\tau} \quad (1)$$

wherein $0 \leq \tau \leq n$ and wherein the average value of the n actual measured values $f_i$ $$\bar{f} = \frac{1}{n} \sum_{i=1}^{n} f_i \quad (2)$$

and provided that the average value of the 2n nominal or reference values $s_i$ is equal to zero $$\sum_{i=1}^{2n} s_i = 0 \tag{3}$$

Execution of a calculation or computation according to equation (1) produces the cross-correlation function $\phi_{fs}(\tau)$ between n sensor values and 2n track position values in the form of n+1 given or ordinate values.

For the track positions of both vehicles FZ and FZ' illustrated in FIG. 2a, the cross-correlation functions $\phi_{fs}(\tau)$ and $\phi'_{fs}(\tau)$ result, as illustrated in FIG. 3a based upon the aforesaid sets of values for $f_n$, $f_n'$ and $s_n$. It is known that these relate to discrete or pseudo-continuous functions depending on the size of the uniform mutual spacing d. Furthermore, it can be seen that the track positions or locations of the vehicles FZ and FZ' are given by the maxima of the corresponding cross-correlation functions $\phi_{fs}(\tau)$ and $\phi'_{fs}(\tau)$. Accordingly as a next step, a simple analytical or computational procedure for determining the maximum of the cross-correlation function $\phi_{fs}(\tau)$ must be specified.

The intended or provided utilization of eight track sensors or guide marker sensors with a uniform mutual spacing d previously mentioned as a preferred embodiment of the invention represents a compromise, in particular for ensuring that the measurement-technological effort will be low. This necessitates a discrete cross-correlation function $\phi_{fs}(\tau)$ which can detect the track position or location of a vehicle FZ only within the scope of the raster or unidirectional grid, which itself is a function of the uniform mutual spacing or separation d, i.e. only if the position or location of the vehicle coincides with one of the positions or locations of the track. On the other hand, the vehicle will occupy with a far greater probability track positions or locations lying off the raster or grid which, for the requirements of track guidance must be determined with high resolution due to regulation-technological reasons. The discrete cross-correlation function comprising nine ordinate or given values is therefore transformed through interpolation of the missing functional values into continuous function such as would be obtained with an infinite number of track or guide sensors. The complete solution of this problem, namely:

establishing a polynomial of the $n^{th}$ order by means of the n+1 ordinate or given values;
differentiating this polynomial;
calculating n-1 roots of the polynomial derivative; and
searching for the root coinciding with the absolute maximum in the definition region, entails too much calculation for the intended application, since only a few milliseconds are available per calculation cycle during fast travel (up to 1.5 meters per second).

Therefore another method is used which delivers very good results at justifiable expense. This method exploits the recognition that the cross-correlation function need comprise a continuous curve only in the region of its maximum, since only this region is important for determining the track position of the vehicle. This novel method or procedure comprises the following three steps:

Step 1 The maximum (=M) of the n+1 ordinate or given values is sought;

Step 2 A second-degree polynomial is fitted through this point and both its neighboring points left and right; and Step 3 The derivative of this polynomial is a first-degree function (straight line) whose zero-crossing point can be easily determined. Since the three determined ordinate or given values contain a maximum, the zero-crossing point of the derivative must correspond to a functional maximum.

These procedure steps are explained in detail hereinbelow:

Step 1

If the reference coordinate M along the abscissa is found with the maximum functional value, then it must be assured that a value M−1 to the left and a value M+1 to the right is available. If M lies at 1 or n+1, then it is assumed that the maximum has been found (1 or n+1, respectively). In case the three functional values lie along a straight line, a special operation is performed in lieu of Steps 2 and 3.

Step 2

The following polynomial is set up:

$$\phi(m) = a_2 m^2 + a_1 m + a_0 \tag{4}$$

and the reference coordinate M (with the maximum value $\phi(M)$) which has been found is set equal to zero as an X-value of the polynomial. It is further assumed that:

$$(M+1) - M = ms = 1 \text{ and } (M-1) - M - ms = -1$$

Thus:

$$a_0 = \phi(M) \tag{5}$$

With the relationships:

$$\phi(M-1) = a_2 \cdot ms^2 - a_1 \cdot ms + \phi(M) \tag{6}$$

$$\phi(M+1) = a_2 \cdot ms^2 + a_1 \cdot ms + \phi(M) \tag{7}$$

both polynomial coefficients $a_1$ and $a_2$ can be determined:

$$a_1 = \frac{\phi(M+1) - \phi(M-1)}{2 \, ms} \tag{8}$$

$$a_2 = \frac{\phi(M+1) + \phi(M-1) - 2\phi(M)}{2 \, ms^2} \tag{9}$$

which completes the second step.

Step 3

The derivative of the polynomial is formed:

$$\frac{d\phi}{dm} = 2a_2 ms + a_1 \tag{10}$$

Setting this equal to zero and solving for m results in:

$$m = -\frac{a_1}{2a_2} \tag{11}$$

Substituting equations (8) (9) for $a_1$ and $a_2$ in yields:

$$m = \frac{\phi(M-1) - \phi(M+1)}{\phi(M+1) + \phi(M-1) - 2\phi(M)} \cdot \frac{ms}{2} \tag{12}$$

with m in the region: $-1 \leq m \leq 1$.

The result m is the interpolated location of the maximum of the cross-correlation function relative to the location M of the maximum ordinate or given value, which completes the third step.

The deviation As of the track or guide sensors $SS_1 \ldots SS_8$ with respect to the center of the track or guide marker which is sought can be determined as follows:

$$As = \left(\frac{n}{2} + 1\right) - M - m \quad (13)$$

In case the three functional values $\phi(M-1)$, $\phi(M)$ and $\phi(M+1)$ lie in a straight line, the denominator in equation (12) above becomes zero. This special case is to be separately treated according to the slope of the line:

1. All three points comprise the same functional value and the slope of the line is equal to zero: the maximum is located at M and therefore m=0.
2. The three points comprise different functional values, the maximum is the largest of both extreme values, thus, if the slope is positive, the maximum is located at M+1 and therefore m=1 or, if the slope is negative, the maximum is located at M−1 and therefore m=−1.

In order to function as a passive track control system according to FIG. 5, information is necessary at certain locations of the travel network so that the vehicle FZ can execute a predetermined function at the correct position, such as e.g. stopping, turning left or right, unloading, reducing speed et cetera. For vehicles equipped with on-board control processors, additional information is necessary, such as e.g. location designation, path or track designation, transfer location numbers et cetera, in order to assure autonomous operation independent of stationary facilities or apparatus. This information, whose elements generally consist of several bits (a data word), is necessary for a highly accurate determination of location and is encoded in the bar code 28. This information is read during travel or standstill by the code sensors $CS_1 \ldots CS_5$ and the information received thereby is transmitted or sent to the vehicle control system or circuit. For practical reasons the number of narrow (logical "0") and wide (logical "1") code strips 31 contained in the bar code 28 are limited. In the aforesaid preferred embodiment of the invention from one to sixteen information bits and up to five additional correction or redundance bits are used per data word. The number of information bits is determined for each practical application and remains constant throughout an installation.

Reading the bar code 28 is accomplished by the three sequentially arranged code sensors $CS_1$, $CS_2$ and $CS_4$ and is also possible when the vehicle is standing still or performing a reciprocating motion or commutation over the code. By using three code reading sensors, a reciprocating motion over the code strips 31 with amplitude of as little as 5 mm can be recognized and multiple evaluations of one of the same code strips 31 can be eliminated. The reading of the code is initiated by the code sensors $CS_3$ and $CS_5$. Since a strobe light is not necessary, the reading head 21 containing the code sensors $CS_1 \ldots CS_5$ can be biased or angled up to $\pm 30°$ in relation to the bar code 28.

One of the code strips 31 for logical "0" is recognized in that the code sensors $CS_1$, $CS_2$ and $CS_4$, depending on previous conditions, are put into a "sensor one" state corresponding to a combination which depends upon the reading direction. One of the code strips 31 for logical "1" is recognized in that the code sensors $CS_1$, $CS_2$ and $CS_4$ are put into a "sensor one" state independently of their previous condition. The beginning or end of the code is produced by significant or pronounced spacings or gaps 44 and 44' in the reflecting material which place all sensors, that is both code reading sensors $CS_1$, $CS_2$ and $CS_4$ as well as the initializing sensors $CS_3$ and $CS_5$, in the "sensor zero" state over an extended period. The gap or spacing 27 between the code strips 31 is selected such that none of the above-mentioned states for logical "0" or logical "1" can occur simultaneously with the beginning or the end of the code. At least one of the three code reading sensors $CS_1$, $CS_2$ and $CS_4$ is always in the "sensor one" state. The code strips 31 may be considered as marks and the gaps 27 as spaces of the bar code 28.

The economical superiority of the inventive passive track system becomes truly apparent when track guidance and functional control are effected simultaneously. The passive track 9 is then doubly exploited, namely both for the track sensors $SS_1 \ldots SS_8$ as a control line or guide marker and for the code sensors $CS_1 \ldots CS_5$ as a bar code or source of information. The bar code 28 is also simultaneously utilized for track guidance, together with its specific or inherent function for functional control. Even though the reflecting code strips 31 exhibit a lower average brightness value than the regular continuous passive track 9, the contrast is still sufficient for track guidance.

In the illustrated exemplary embodiment the inventive passive track system is described for use with the automatic operation of a floor-level conveyor installation. However, such a passive track system is generally applicable to transport devices in the storage or warehousing and conveying industry as well as for automatically displacing constructional elements from which constructional units can be assembled.

The inventive passive track may be formed in discrete regions with gaps therebetween in which the guide marker function or the control information function or both of the passive track are absent. In these gaps the on-board control processors of each vehicle FZ extrapolate at least the guide marker function from information previously gathered.

While there are shown and described present preferred embodiments of the invention, it is to be distinctly understood that the invention is not limited thereto, but may be otherwise variously embodied and practiced within the scope of the following claims. Accordingly,

What I claim is:

1. A passive track system for guiding and controlling on a traffic surface robotic transport and assembly vehicles each having a central longitudinal axis, comprising:
   a passive track attached to said traffic surface and defining a guide line for said vehicles;
   said passive track having a centerline;
   said passive track having at least one differentiating characteristic in relation to said traffic surface;
   a sensing device mounted at each of said vehicles for following said passive track;
   a predetermined number of track sensors of said sensing device mounted at each of said vehicles for producing a set of actual value signals indicative of said at least one differentiating characteristic of said passive track for continuous track guidance of each said vehicle;

said predetermined number of track sensors being attached to the underside of each said vehicle in a transverse direction and substantially symmetrical to said central longitudinal vehicle axis and having a substantially uniform mutual spacing;

a predetermined number of track locations twice as great as said predetermined number of track sensors and having the same substantially uniform mutual spacing as said predetermined number of track sensors and symmetrically arranged with respect to said centerline of said passive track;

said predetermined number of track locations having a set of reference values associated therewith;

a control processor circuit supported on each of said vehicles and operatively connected with said predetermined number of track sensors for cross-correlating said set of actual value signals produced by said predetermined number of track sensors and said set of reference values associated with said predetermined number of track locations for deriving therefrom a vehicle position signal indicative of the transverse position of said vehicle relative to said passive track and a track condition signal indicative of the condition of said passive track;

a predetermined number of bar codes associated with said passive track;

an evaluation circuit supported on each of said vehicles;

a predetermined number of code sensors being attached to said underside of each said vehicle for cooperation with said predetermined number of bar codes; and said predetermined number of code sensors being operatively connected with said evaluation circuit for generating, in response to each one of said predetermined number of bar codes, control signals controlling the operation of said vehicle.

2. The passive track system as defined in claim 1, wherein:

said passive track system has predetermined nominal data associated therewith; and said set of reference values being correlated to said predetermined nominal data and having a mean value of zero.

3. The passive track system as defined in claim 1, further including:

said passive track containing travel zones;

an associated track condition signal being determined for each combination of said vehicles and said travel zones; and said associated track condition signal being assigned by majority decision to a predetermined vehicle of said vehicles.

4. The passive track system as defined in claim 1, further including:

said passive track continuing travel zones;

an associated track condition signal being determined for each combination of said vehicles and said travel zones; and said associated track condition signal being assigned by majority decision to a predetermined travel zone of said travel zones.

5. The passive track system as defined in claim 1, wherein:

said differentiating characteristic of said passive track comprises an optical coefficient of reflection of said passive track which is different from an optical coefficient of reflection of regions of said surface adjacent to said passive track.

6. The passive track system as defined in claim 5, wherein:

said passive track comprises a brush-painted passive track which has a greater coefficient of reflection than said regions of said surface adjacent to said passive track.

7. The passive track system as defined in claim 5, wherein:

said passive track comprises a spray-painted passive track which has a greater coefficient of reflection than said regions of said surface adjacent to said passive track.

8. The passive track system as defined in claim 5, wherein:

said passive track comprises an adherent reflective metallic tape which has a greater coefficient of reflection than said regions of said surface adjacent to said passive track.

9. The passive track system as defined in claim 5, wherein:

said passive track comprises an adhesive reflecting synthetic tape which has a greater coefficient of reflection than said regions of said surface adjacent to said passive track.

10. The passive track system as defined in claim 1, wherein:

said passive track has a predetermined width which is three times said uniform mutual spacing of said predetermined number of passive track sensors.

11. The passive track system as defined in claim 1, wherein:

said passive track is defined as discrete regions defining gaps therebetween; and said vehicles including means for extrapolating said passive track in said gaps.

12. The passive track system as defined in claim 11, wherein:

said traffic surface is provided with a contrast-enhancing low reflective background finish.

13. The passive track system as defined in claim 11, wherein:

said predetermined number of bar codes are located in related ones of said gaps formed in said passive track.

14. The passive track system as defined in claim 1, wherein:

said passive track having a predetermined width;

said vehicles defining, during travel along said passive track, a maximum deviation of said vehicles in relation to said guide line; and said predetermined number of bar codes having a width greater than said predetermined width of said passive track in order to account for said maximum vehicle deviation from said guide line.

15. The passive track system as defined in claim 14, wherein:

said traffic surface being provided with a contrast-enhancing low reflective background finish in the region of said predetermined number of bar codes.

16. The passive track system as defined in claim 1, wherein:

said predetermined number of bar codes are located in regions of said traffic surface adjacent to said passive track.

17. The passive track system as defined in claim 1, wherein:
said evaluation circuit operatively connected with said code sensors, is integrated into said control processor circuit.

18. The passive track system as defined in claim 1, wherein:
each one of said predetermined number of bar codes comprises a self-correcting code and is capable of tolerating lateral motion of up to 5 mm during the reading operation.

19. The passive track system as defined in claim 1, wherein:
said predetermined number of track sensors defines an integral optical unit; and
said integral optical unit comprising reading heads as components thereof for reading said passive track.

20. The passive track system as defined in claim 1, wherein:
said predetermined number of code sensors defines an integral optical unit; and
said integral optical unit comprising reading heads as components thereof for reading said bar code.

21. A passive track guidance and control system for a traffic surface for robotic vehicles, comprising:
a passive track attached to said traffic surface as a guide marker for guiding said robotic vehicles;
said traffic surface having at least one identifying characteristic;
said passive track having a centerline and exhibiting at least one identifying characteristic optically distinguishable from said at least one identifying characteristic of said traffic surface;
an optical sensing device mounted on each vehicle of said robotic vehicles for optically tracking said passive track;
each said vehicle having an underside and a central longitudinal axis;
said optical sensing device comprising a plurality of track sensors transversely arrayed in a predetermined spacing on said underside of each said vehicle;
said passive track comprising a number of track stripes in a predetermined relation to said plurality of track sensors;
said stripes being arrayed on said traffic surface;
a control processor mounted in each said vehicle for correlating a set of actual values sensed by said plurality of track sensors in response to said identifying characteristics of said number of track stripes of said passive track and adjacent regions of said traffic surface with a set of reference values associated with said track stripes and said adjacent passive track regions for deriving from said correlation a vehicle position signal indicative of the transverse position of said vehicle relative to said passive track and a track condition signal indicative of the optical condition of said passive track;
said passive track comprising discrete track marks defining track spaces therebetween;
said discrete track marks and said track spaces conjointly defining a bar code;
said optical sensing device further comprising a plurality of code sensors attached to said underside of said vehicle for cooperation with said bar code;
an evaluation circuit; and
said plurality of code sensors being operatively connected with said evaluation circuit for generating in response to said bar code, control signals controlling the operation of said vehicle.

22. A method of operating a passive track guidance and control system on a traffic surface for robotic vehicles, comprising the steps of:
employing an optical sensing device mounted on at least one vehicle of said robotic vehicles and comprising a plurality of track sensors to monitor, during travel of said at least one vehicle on said traffic surface, a passive track applied to said traffic surface;
directionally guiding said at least one vehicle in relation to information gained by said optical sensing device when monitoring said passive track;
employing a control processor mounted on said at least one vehicle to perform statistical correlation of said information gained by said optical sensing device with reference data relative to said passive track;
deriving from said statistical correlation an optical condition coefficient of said passive track;
employing said control processor to decode control information incorporated into said passive track in the form of a bar code; and
controlling operational functions of said vehicle in relation to said control information.

23. The method as defined in claim 22, wherein:
said step of employing a control processor to perform said statistical cross-correlation entails employing a discrete cross-correlation function having a maximum; and
employing a track guidance algorithm to complement said discrete cross-correlation function in the region of said maximum to obtain a continuous function.

24. The method as defined in claim 23, wherein:
said step of employing said track guidance algorithm entails employing an interpolation procedure to determine continuous function values between discrete function values.

25. A passive track system for guiding and controlling robotic transport and assembly vehicles on a traffic surface, said vehicles having a predetermined longitudinal axis, comprising:
a passive track located on said traffic surface and defining a guide line for said vehicles;
said passive track having a centerline;
said passive track further having at least one differentiating characteristic in relation to said traffic surface;
a predetermined number of bar code data associated with said passive track and located at defined places along said passive track;
a sensing device mounted on each of said vehicles for following said passive track;
said sensing device containing a predetermined number of track sensors being attached to the underside of each said vehicle in a transverse direction and substantially symmetrical to said longitudinal vehicle axis and having a substantially uniform mutual spacing;
each one of said track sensors being responsive to said differentiating characteristic of said passive track and generating a set of sensor signals representing a set of actual value signals indicative of the transverse position of said vehicle relative to said passive track;

an evaluation circuit connected to said track sensors for receiving said set of sensor signal;

said evaluation circuit storing a set of a predetermined number of reference values, which number is greater than said predetermined number of track sensors;

said reference values being related to a predetermined number of respective track locations symmetrically distributed with respect to said track centerline and having the same mutual distance as the track sensors;

said evaluation circuit containing a control processor circuit for statistically combining said set of actual value signals and said set of reference values for deriving therefrom at least one position signal indicative of the position of said longitudinal axis of each vehicle relative to said track centerline;

a reading device supported on each said vehicle and for detecting each one of said predetermined number of bar code informations; and said reading device being connected to said evaluation circuit for generating control signals for controlling the operation of the vehicle.

26. The passive track system as defined in claim 25, wherein:

said predetermined number of reference values is twice as great as said predetermined number of track sensors; and said control processor circuit carrying out, as said statistical combination, a cross-correlation between said track sensor generated actual value signals and said stored reference values

* * * * *